No. 882,933. PATENTED MAR. 24, 1908.
W. E. DRAKE.
MUD GUARD FOR VEHICLE WHEELS.
APPLICATION FILED MAY 18, 1907.
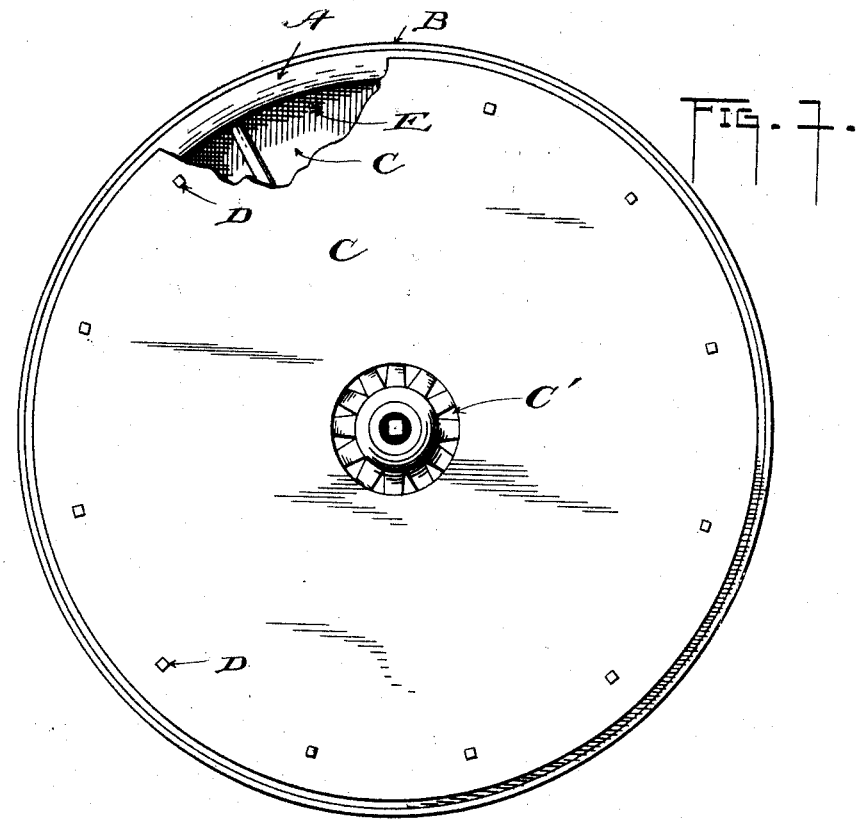
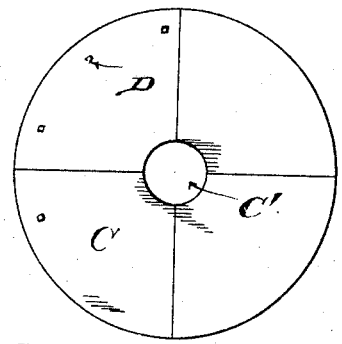
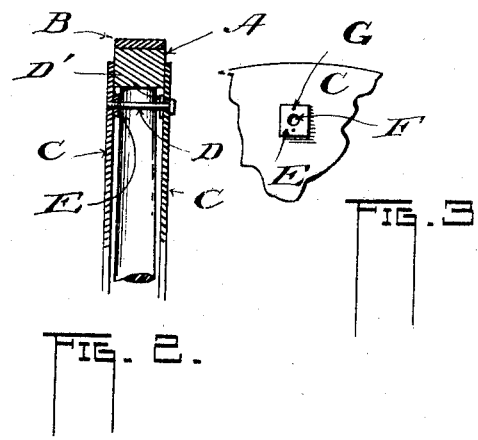
Witnesses:
Inventor
William E. Drake

UNITED STATES PATENT OFFICE.

WILLIAM E. DRAKE, OF CHANDLERVILLE, ILLINOIS.

MUD-GUARD FOR VEHICLE-WHEELS.

No. 882,933.                Specification of Letters Patent.        Patented March 24, 1908.

Application filed May 18, 1907. Serial No. 374,505.

*To all whom it may concern:*

Be it known that WILLIAM E. DRAKE, citizen of the United States, residing at Chandlerville, in the county of Cass and State of Illinois, has invented certain new and useful Improvements in Mud-Guards for Vehicle-Wheels; and he does hereby declare that the following is a full, clear, and exact description of the invention, which will enable others skilled in the art to which it appertains to make and use the same.

This invention pertains to a mud guard for vehicle wheels.

The object of the invention is to provide a simple attachment for the wheels of vehicles for the purpose of preventing the spaces between the spokes becoming filled with mud.

On country roads, especially in the spring, it is well known that much trouble is experienced by the wheels becoming filled with mud which makes them extremely heavy the driver being often compelled to unhook his team and leave the vehicle until help can be secured by which to withdraw it from the mud. The wheels often sink almost to their hubs and when the mud is very stiff the spaces between the spokes are entirely filled and the friction of the gathered mud in cutting through the mud of the road is very great. It is my purpose in view of this to provide simple means by which the trouble can be obviated. This will be fully understood from the following description aided by the accompanying drawing in which Figure 1 is a side view of a wheel showing a plate for covering and protecting the spokes. Fig. 2 is a transverse section showing a plate on each side of the felly. Fig. 3 is a face view of a portion of one of the plates showing a member attached thereto for receiving the end of a bolt. Fig. 4 is a modified form of the device shown in sections.

A represents the felly of the wheel having the usual tire B. At each side of the wheel is a plate C of sheet metal which may be of steel, or even some non-corrosive metal, or alloy, of sufficient size to almost cover the entire wheel and lie upon the felly within a short distance of the tire B this covering being slightly removed from the tread of the wheel so that it will not strike the road surface. In the center of the plate is an opening C' which allows for the hub; such opening, however, being somewhat larger than the hub so as to leave an annular space between it and said hub as shown. At intervals I provide bolts D for securing the plates firmly against the wheel to prevent movement thereof. Upon the inner surface of one of the plates as at E Figs. 2 and 3, is a member E, secured, as for instance, by rivets G or other good means to said plate, said member having a threaded aperture at F. This said member is provided to receive the threaded end of the bolt D described, the head of said bolt bearing against the outside of the opposite plate where it can be turned by means of a wrench. Inside the latter plate is secured a member D' corresponding to E except that its aperture is not threaded but is sufficiently large to permit the bolt to easily slip therethrough, said member being employed to strengthen or stiffen the plate beneath the bolt-head. The members E and D' need not necessarily be employed since one of the plates could be threaded to receive the bolt. But any other means could be employed by which to firmly clamp the plates in position.

In Fig. 4 I show a plate made in several sections. By this means smaller portions may be used from which to cut the parts so as to reduce expense although it is preferable to have a one piece member since it is more quickly placed upon the wheel. In using the sections, the edges are preferably made to abut so that no laps or edges will be presented to cause friction in passing through the mud.

The advantage of my device will be apparent. In passing through mud, no matter how stiff it may be, the wheels simply make the track and the wheel passes therethrough with little or no friction because the plates are parallel to one another and readily pass through the channel or track cut by the wheel-rim. In case the wheel rim or felly is out of true or the sections thereof are not quite in line thus leaving gaps between the plate C and the felly so that road material can pass between said felly and plate into the interior, I have purposely made the opening C' of much larger size than the hub so that the material can be given free passage and be liberated by falling through the annular space shown in Fig. 1. The material, if wet, will, when it becomes dry, or nearly so, liberate itself and shake and rattle out from between the spokes at each side of the wheel and it can also be readily dislodged at the opening or recess by the use of a stick or the like. By this means the wheel will not become clogged and heavy in the manner described due to the defects in the wheel rim. Dry dirt when forced into the interior will escape at once. The plates, in addition to forming mud guards, provide protection for the paint and mud will not be thrown from the plates in all directions upon the vehicle body as is the case with an open wheel where the spokes hold the mud.

I desire to make it understood that I do not wish to confine myself to exactly what is shown since slight changes may be made that will still come within the scope and intent of my invention.

Having thus described my invention, I claim:

A wheel, plate sections secured to and for covering each side thereof to inclose the felly and the spokes but leaving an annular space surrounding the hub between said sections and said hub to partially expose the hub ends of the spokes and the spaces therebetween for the purpose described, bolts extending through the plates for clamping the latter to the wheel, and members secured to the plates for reinforcing them and through which the bolts extend and with certain of which the said bolts engage as set forth.

In testimony whereof I affix my signature, in presence of two witnesses.

WILLIAM E. DRAKE.

Witnesses:
 L. M. THURLOW,
 A. KEITHLEY.